United States Patent

[11] 3,578,378

[72] Inventor Edwin G. Anderson
 804 Northey Drive, Sacramento, Calif. 95833
[21] Appl. No. 815,309
[22] Filed Apr. 11, 1969
[45] Patented May 11, 1971
 Continuation-in-part of application Ser. No. 618,099, Feb. 23, 1967, now abandoned.

[54] TELESCOPIC AND PIVOTAL COVER ASSEMBLY FOR OPEN BED VEHICLES
 40 Claims, 27 Drawing Figs.
[52] U.S. Cl. .................................................. 296/137
[51] Int. Cl. .................................................. B60j 7/10
[50] Field of Search .......................................... 296/100, 137, 137 (E); 308/3.8, 3.9, 6; 312/333, 341; 160/193; 49/234

[56] References Cited
 UNITED STATES PATENTS
 515,248 2/1894 Phipps ........................... 49/234
 2,074,358 3/1937 Bixel et al. .................... 296/100
 2,853,340 9/1958 Hershberger ................... 296/137
 3,165,352 1/1965 Hallock et al. ................ 296/100
 3,342,523 9/1967 Lutgen ........................... 296/100

Primary Examiner—Kenneth H. Betts
Assistant Examiner—Robert R. Song
Attorney—Flehr, Hohbach, Test, Albritton and Herbert ABSTRACT: A telescopic cover assembly for open bed vehicles comprising a plurality of cover segments at least one of which is longitudinally movable. The movable segment carries wheel assemblies engageable with a guide rail along which the segment is movable. The guide rail is constructed to elevate the movable segment during movement towards an extended position. Cutouts are provided in the guide rail in which the wheel assemblies are engageable for maintaining the movable segment in predetermined locations. Improved mounting means for the guide rail, and improved gate closure structure also are included in the cover assembly. In a preferred embodiment, the cover is pivotal upwardly to permit unrestricted access to the vehicle bed.

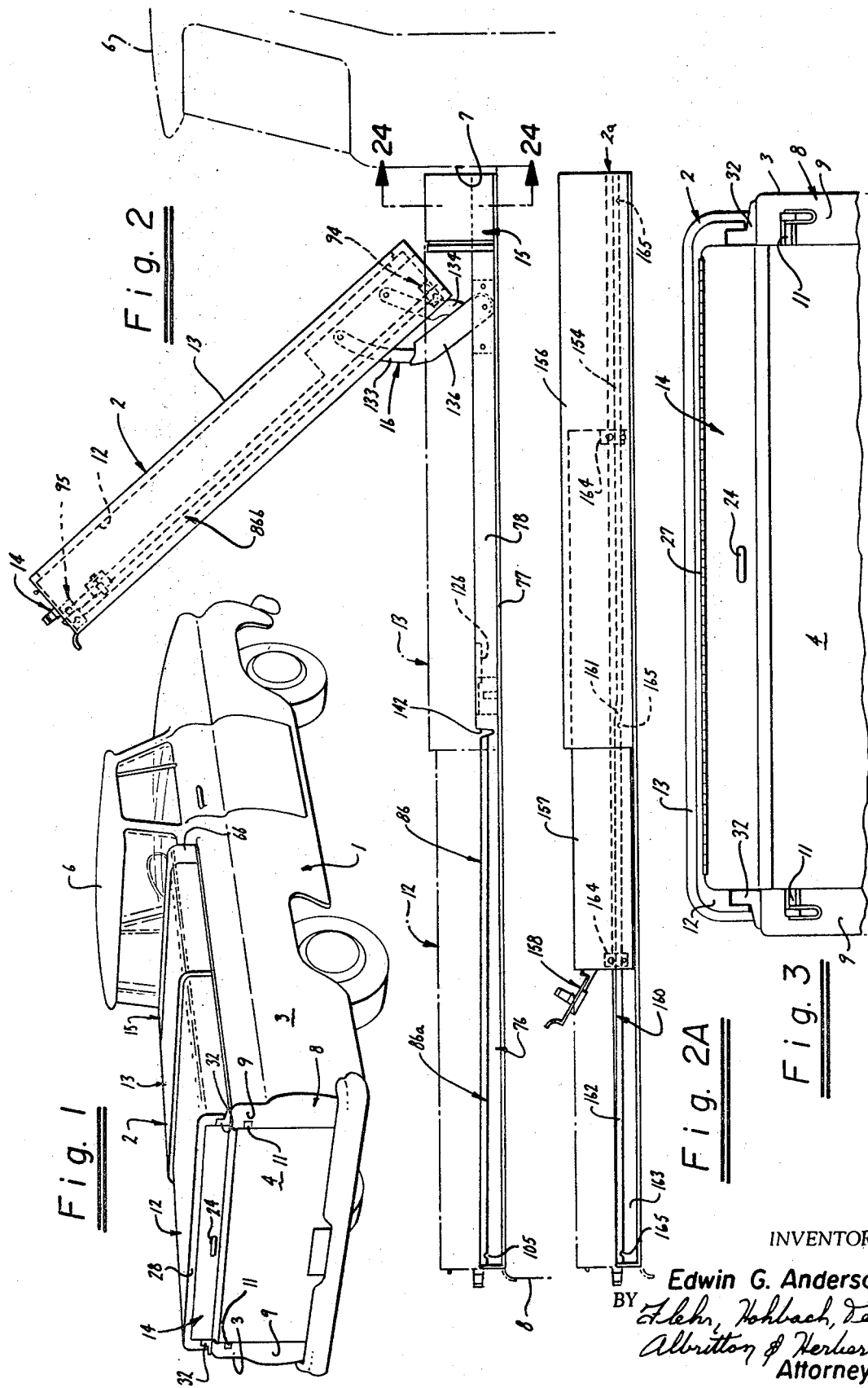

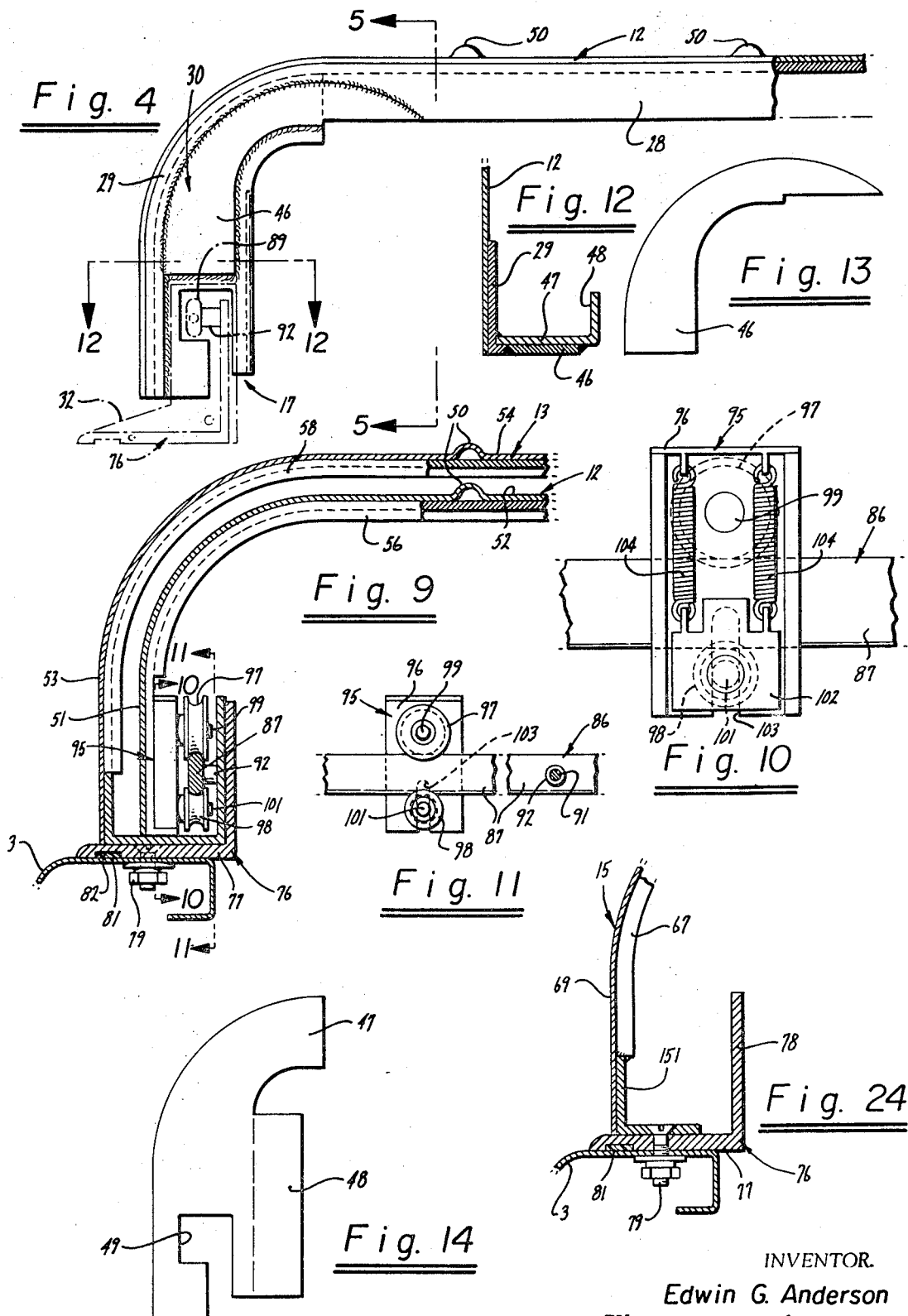

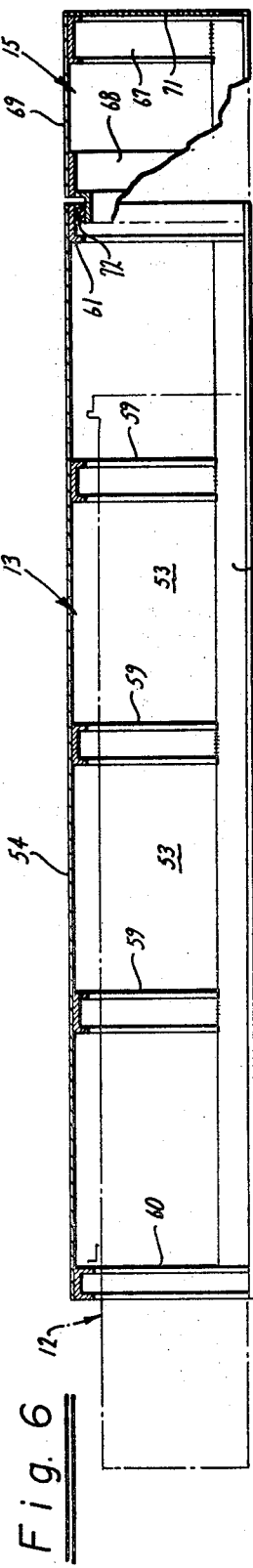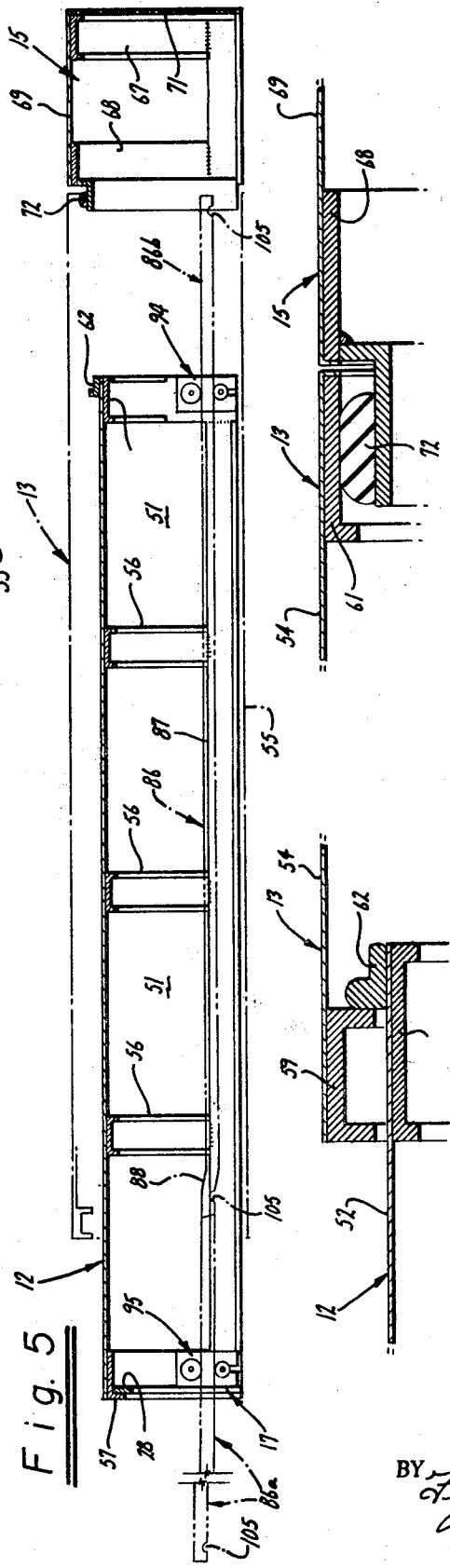

INVENTOR.
Edwin G. Anderson
BY Flehr, Hohbach, Test,
Albritton & Herbert
Attorneys

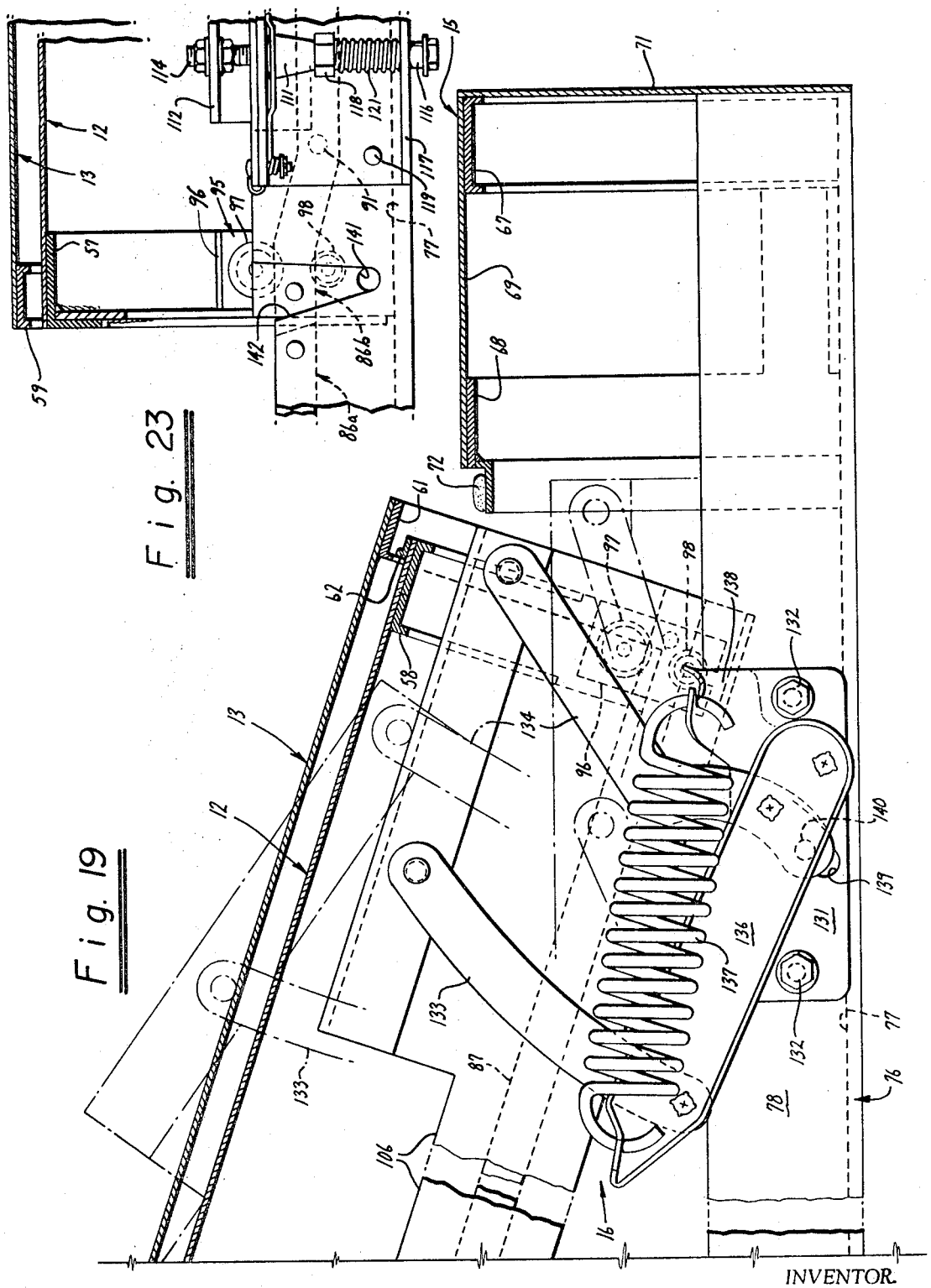

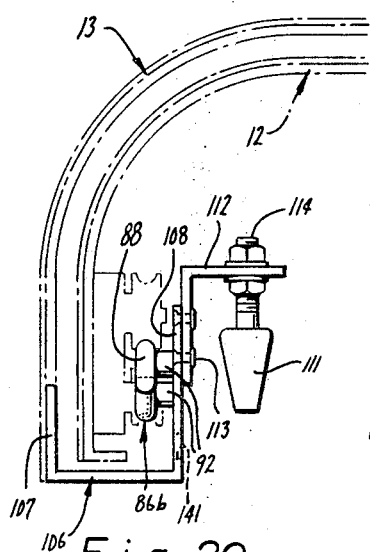
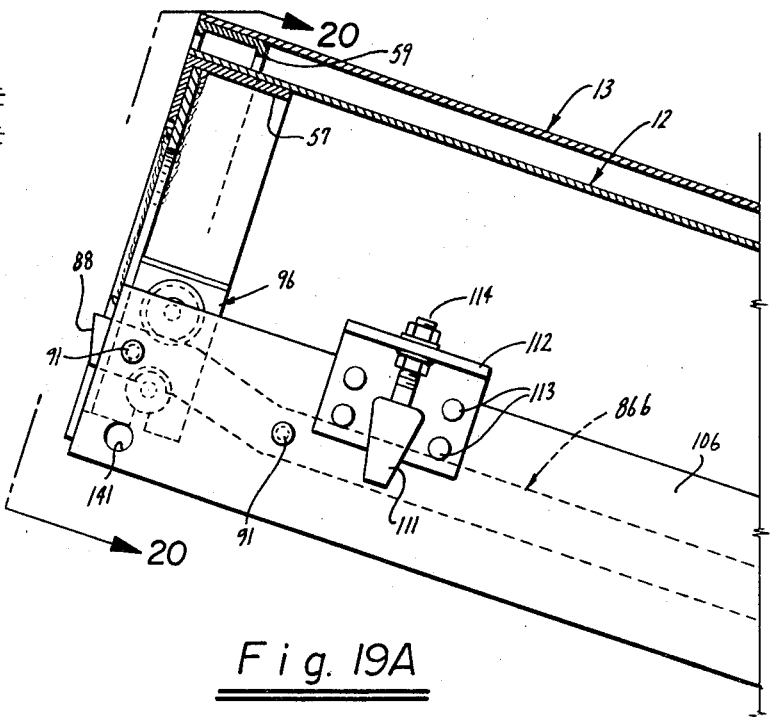
Fig. 20
Fig. 19A
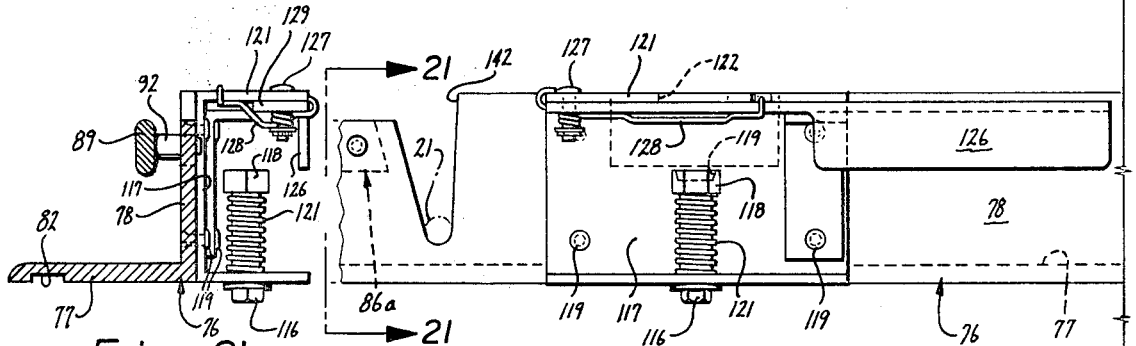
Fig. 21
Fig. 19B
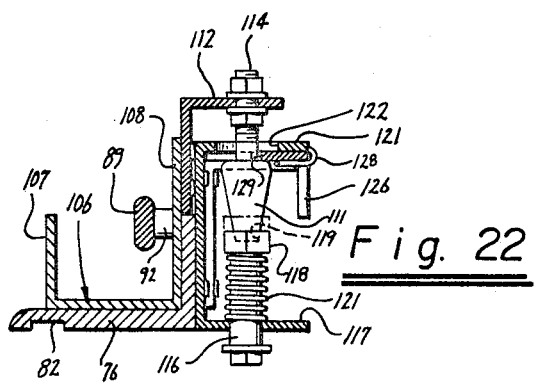
Fig. 22
INVENTOR.
Edwin G. Anderson

TELESCOPIC AND PIVOTAL COVER ASSEMBLY FOR OPEN BED VEHICLES

This application is a continuation-in-part of application Ser. No. 618,099, filed Feb. 23, 1967, titled "Telescoping Cover For Open Bed Trucks," now abandoned.

BACKGROUND OF THE INVENTION

1. Field of the Invention

This invention relates to cover assemblies for open bed vehicles, such as pickup trucks and the like. More particularly, this invention relates to the field of telescoping covers for open bed vehicles in which at least one cover segment is movable relative to other cover segments for selective positioning to overlie or expose the open bed of the vehicle.

Still more particularly, this invention relates to the field of cover assemblies for open bed vehicles in which the cover may be pivoted upwardly away from the open bed to provide unrestricted access to the bed for loading and unloading cargo relative thereto.

2. Description of the Prior Art

Telescopic covers for open bed vehicles have been known generally in the prior art heretofore. Typical of such prior constructions are the cover structures shown in the following U.S. Pat. Nos.: Hershberger, 2,853,340; Hallock et al., 3,165,352; Lutgen, 3,342,523; and Bixell, 2,074,358. While the identified patents are representative of the type of vehicle covers available to the trade heretofore, none possesses the improved cover segment mounting and guide means, and end gate closure means, disclosed herein, nor the improved construction by means of which a cover assembly may be pivoted as a unit upwardly and away from the open bed of a vehicle to provide unrestricted access to the bed.

The sturdy construction and ease of operation of the preferred embodiments of the cover assembly illustrated and described herein produce a structure superior to that disclosed in the patents above noted and in commercial embodiments available on the open market. So far as is known, the specific features of novelty stressed herein have not been known or utilized heretofore.

SUMMARY OF THE INVENTION

The subject invention relates to a telescopic cover assembly for open bed vehicles, such as pickup trucks and the like, in which a plurality of two or more sturdy, generally rigid, cover segments are mounted for movement relative to each other to permit selective exposure or closing off of the bed of the vehicle over which the cover is mounted. To that end, improved means are provided for mounting and guiding at least one cover segment for longitudinal movement relative to another longitudinally fixed cover segment in telescopic fashion.

The movable segment is spaced from the fixed cover segment to avoid contact and binding therebetween when the movable segment is traversed between its extended and retracted positions but the movable segment mounting and guiding means includes structure for elevating the movable segment into contact with the fixed segment when the movable segment is extended. The mounting and guiding means provided also includes a cooperable structure for positively retaining the movable segment in predetermined positions.

Improved means for closing the end of the cover assembly when the same is in the extended position also are provided.

Furthermore, this invention relates in a preferred embodiment to a telescopic cover which is also pivotal upwardly away from the open bed of the vehicle so that unrestricted access to the vehicle bed may be obtained for facilitating loading and unloading of cargo therefrom. Such pivotal movement is normally effected when the cover is in the retracted or telescoped position. Lock or latching means are provided for releasably retaining the cover against pivotal movement when such pivotal movement is not desired.

The cover is constructed in such fashion that the same is generally water tight when extended to provide maximum protection for cargo carried in the vehicle.

From the foregoing it should be understood that objects of the invention, among others, include: the provision of an improved telescopic cover assembly for open bed vehicles, such as pickup trucks and the like; the provision of a tilt-up telescopic cover which is mounted for pivotal movement upwardly and away from a vehicle bed to permit unrestricted access to such bed; the provision of improved means for mounting a movable segment of a telescopic cover for longitudinal movement between extended and retracted positions; the provision of improved means for closing an end of a telescopic cover when the same is extended; the provision of means for pivotally mounting a cover for tilt-up movement relative to a vehicle bed, along with means for releasably latching the cover against pivotal movement; the provision of improved guide rail means and cooperable wheel assemblies for mounting and guiding a cover segment for longitudinal movement between extended and retracted positions, and for maintaining such movable segment in predetermined positions when extended or retracted; the provision of a telescopic cover in which segments movable relative to each other are constructed and arranged to minimize the possibility of the same becoming jammed together should minor deformation of the segments result from accidents or the placing of heavy objects on the exterior of the segments; and the provision of a telescopic cover in which the same may be locked in its extended position to preclude unauthorized access to the vehicle body covered thereby.

These and other objects of this invention will become apparent from a study of the following disclosure in which reference is directed to the attached drawings.

DESCRIPTION OF THE DRAWINGS

FIG. 1 is an isometric view of a pickup truck type vehicle on which the subject cover assembly is mounted above the open bed thereof, the cover being shown in the extended position covering such bed.

FIG. 2 is a side elevational view of the cover of FIG. 1, showing the same in the fully retracted and upwardly pivoted position.

FIG. 2A is a side elevational view of a nonpivotal telescopic cover, showing the same in a partially retracted position.

FIG. 3 is a rear elevational view of a portion of the truck body with the subject cover mounted thereon.

FIG. 4 is a partial end elevational view of the movable segment of the cover.

FIG. 5 is a longitudinal sectional view through the cover taken generally in the plane of line 5-5 of FIG. 4 showing constructional details of the longitudinally movable cover segment.

FIG. 6 is a longitudinal sectional view corresponding generally to FIG. 5 showing constructional details of the longitudinally fixed cover segments.

FIG. 7 is a partial vertical sectional view illustrating the contacting relationship between the movable cover segment and the longitudinally fixed cover segment when the former is in the fully extended position.

FIG. 8 is a partial vertical sectional view taken along line 8-8 of FIG. 6 illustrating the relationship between the longitudinally fixed cover segments.

FIG. 9 is a vertical sectional view through a portion of the cover showing details of means for mounting and guiding the movable segment for longitudinal movement.

FIG. 10 is a sectional view through a wheel assembly which forms part of the mounting and guiding means for the movable segment taken in the plane of line 10-10 of FIG. 8.

FIG. 11 is a vertical sectional view taken in the plane of line 11-11 of FIG. 9 showing the cooperable relationship between the wheel assembly and guide rail of the mounting and guiding means.

FIG. 12 is a horizontal sectional view through a portion of the movable cover segment taken in the plane of line 12-12 of FIG. 4.

FIGS. 13 and 14 are plan views of plate members which cooperate to define a portion of an end closure of the cover.

FIGS. 19, 19A and 19B are cooperable side elevational views of the cover assembly showing the same pivoted upwardly away from the vehicle bed, and illustrating details of the latching means and pivotal mounting means thereof.

FIG. 20 is an end elevational view of the cover, partly in phantom lines, taken in the plane of line 20-20 of FIG. 19A.

FIG. 21 is a sectional view through the cover taken in the plane of line 21-21 of FIG. 19B.

FIG. 22 is a sectional view through the cover showing components of the latching means interengaged to preclude pivotal movement of the cover.

FIG. 23 is a side elevational view showing the separable segments of the guide rail for the movable segment in alignment when the cover latching means are interengaged.

FIG. 24 is a vertical sectional view through the longitudinally and pivotally fixed cover segment taken in the plane of line 24-24 of FIG. 2.

DESCRIPTION OF THE PREFERRED EMBODIMENTS

Figure 15:
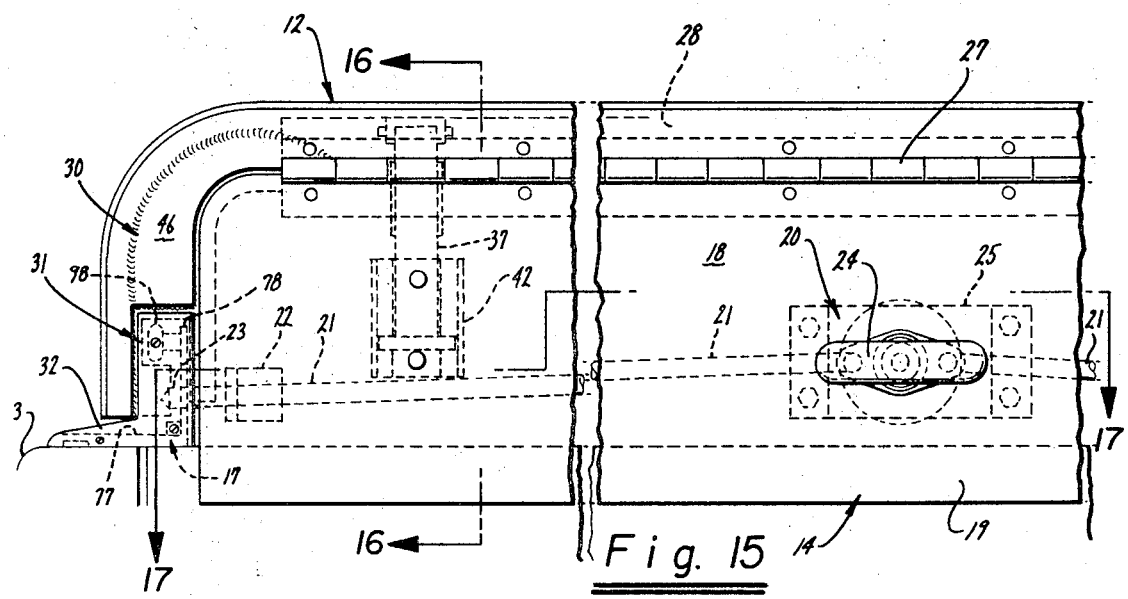
FIG. 15 is a partial end elevational view of the gate closure means for the cover.
Figure 17:
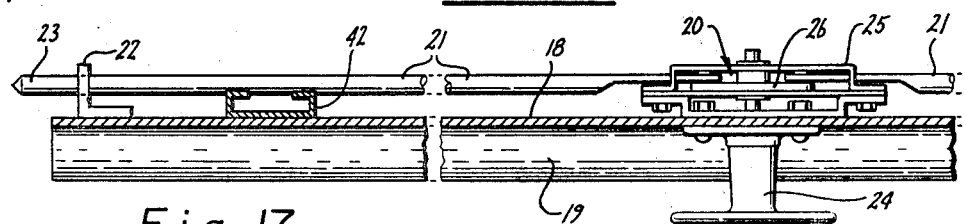
FIG. 17 is a horizontal sectional view through the gate closure taken in the plane of line 17-17 of FIG. 15.
Figure 18:
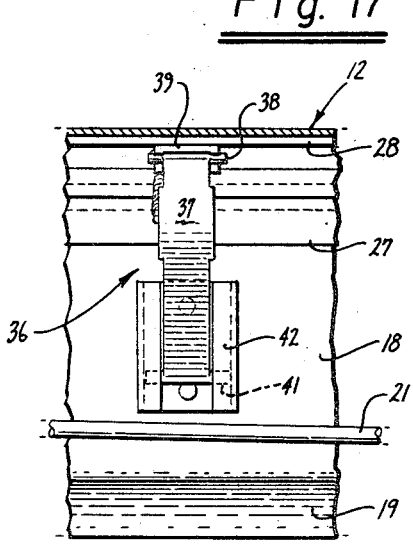
FIG. 18 is a vertical sectional view of a portion of the gate closure taken in the plane of line 18-18 of FIG. 16.

In the application above identified, of which this is a continuation-in-part, a telescopic cover assembly is disclosed, the principal novel features of which are presented herein. This application amplifies the disclosure of the prior application by adding thereto a description of improved and novel means by which a cover assembly may be pivoted upwardly as a unit away from the vehicle bed when unrestricted access to the vehicle bed is desired.

Hereinafter reference is directed to a cover assembly which is comprised of two principal cover segments, one of which is longitudinally movable relative to the other. It should be understood, however, that the novel features disclosed herein may be utilized in cover assemblies employing a plurality of two or more principal cover segments at least one of which is movable relative to the others. Furthermore, certain novel features disclosed herein may be utilized in conjunction with cover assemblies which are pivotally mounted as well as cover assemblies which are not pivotally mounted. Both the pivotal and nonpivotal embodiments of the cover assembly disclosed herein utilize the same basic concepts with the pivotal embodiment employing modified mounting and guiding means for the movable cover segment necessitated by the pivotal nature of its construction.

In FIG. 1, the vehicle with which the subject invention is shown is a conventional pickup truck, designated 1. However, it should be appreciated that the invention is not restricted to use with automotive vehicles, or with automotive vehicles of the particular type illustrated. Similarly, the cover assembly, designated 2, which is shown in FIG. 1 is of the "low profile" type designed to cover the truck bed without extending appreciably above the sidewalls 3 and pivotal end gate 4 of the truck body. However, it should also be appreciated that this invention is utilizable, if desired, in a "high profile" cover construction in which the cover assembly is designed to extend appreciably above the sidewalls 3 and end gate 4 of the vehicle to increase appreciably the size and capacity of the cargo space of the truck bed lying beneath the cover.

Because the pivotal tilt-up cover construction disclosed herein utilizes the principal features of the nontilt-up cover assembly disclosed in the aforementioned application, the tilt-up cover will be described in detail and its relationship to a nonpivotal cover described subsequently. In that connection, the tilt-up cover 2 embodiment is shown generally in FIGS. 1 and 2 in conjunction with truck 1 while the nontilt-up embodiment 2a is illustrated in FIG. 2A.

The truck shown includes a cab 6 from which a normally open truck bed projects rearwardly, the lateral margins of which are defined by the aforementioned upstanding sidewalls 3. The rear wall 7 of the cab 6 defines the front margin of the truck bed, and a rear wall, collectively designated 8, which is defined by the aforementioned pivotal end gate 4 and a pair of opposed rear wall panels 9, cooperate to define the rear margin of the truck bed. End gate 4 is pivotally mounted in known fashion and is held in the closed position shown in FIGS. 1 and 3 by a pair of conventional releasable fasteners 11 interposed between the end gate and the rear wall panels 9.

The tilt-up embodiment of the cover assembly shown comprises two principal generally U-shaped cover segments 12 and 13 which are movable relative to each other. That is, rear segment 12 is longitudinally movable forwardly from the position shown in FIG. 1 to be telescopically nestable within the forward longitudinally fixed segment 13. When thus telescoped, the cover assembly is designed to be pivoted or tilted upwardly as a unit to the solid line position shown in FIG. 2 to provide unrestricted access to the truck bed. The tilt-up embodiment shown also includes a small cover segment 15 which is mounted closely adjacent the truck cab as seen in FIG. 2 and which is fixed against longitudinal and pivotal movement as discussed hereinafter.

Figure 16:
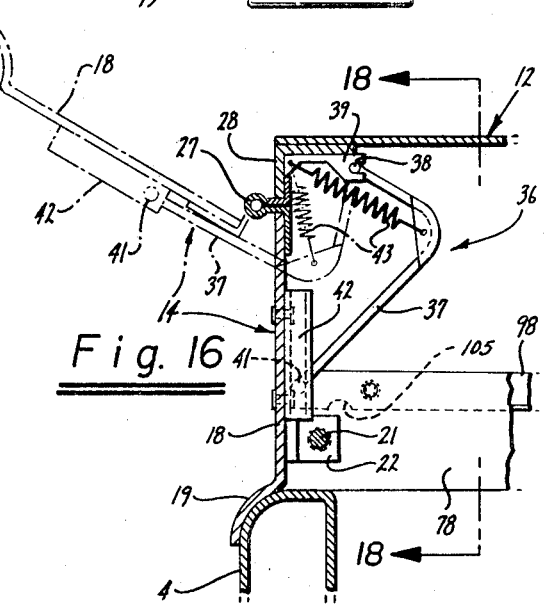
FIG. 16 is a vertical sectional view through the gate closure taken in the plane of line 16-16 of FIG. 15.

Means is provided in conjunction with the cover assembly for cooperating with the rear end wall of the truck body to close off the end of the cover assembly and to permit locking of the same to prevent unauthorized access to the truck bed. Such means comprises a gate closure generally designated 14 hingedly connected with rear cover segment 12 for upward pivotal movement as noted in FIG. 16. As seen in FIGS. 1, 3 and 16, the pivotal gate closure 14 is designed to partially overlie the tail gate 4 of the truck body and to be releasably retained in such position to positively preclude forward movement of the movable rear cover segment 12 as will be described.

In the tilt-up embodiment shown, means is provided at each side of the truck body for fixedly mounting the front cover segment 13 to the truck body. Such means, generally designated 16 in FIG. 2, precludes longitudinal sliding movement of segment 13 but permits tilt-up movement thereof as shown.

Means also is provided along each side of the truck body for mounting and guiding rear cover segment 12 for longitudinal telescopic movement between the extended position shown in FIG. 1 and in dotted lines in FIG. 2 and the collapsed or telescoped position within the front segment shown in solid lines in FIG. 2. Such mounting and guiding means, generally designated 17, supports and guides the movable segment during its telescopic movement between the positions noted. As will also be described hereinafter, the mounting and guiding means for the movable segment includes a structure for holding the movable segment in predetermined positions.

Before describing details of the respective means just mentioned, reference is directed to FIGS. 15 through 18 which show details of the means for closing the rear end of the cover assembly preferably employed with the embodiments disclosed herein. Such means comprises gate closure 14 mounted for upward pivotal movement from the closed or locked position shown in FIGS. 1 and 15 to the open position shown in dotted lines in FIG. 16. The gate closure comprises a rigid generally rectangular metal plate 18 which terminates in a downwardly and outwardly curved extension 19 designed to overlap and contact the tail gate 4 of the truck as best seen in FIG. 16.

When the gate closure extension and tail gate are thus engaged, forward longitudinal sliding movement of the rear cover segment 12 is precluded. For that purpose, the gate closure includes latching means, generally designated 20, which comprises a pair of oppositely directed laterally extending latching arms 21 which pass through suitable guide brackets 22 secured by welding or the like to the inner surface of gate closure plate 18 to constrain movement of the rods 21 other than laterally along closure plate 18. Opposite ends 23 of the respective latching rods are intended to be received in locking interengagement with a portion of the respective mounting and guiding means 17 for the cover segment 12 as seen in FIG. 15 in a manner to be described.

Extension or withdrawal of the respective latching rods 21 to effect secure latching or unlatching of the gate closure is effected by a rotatable control handle 24 which is connected through a toggle mechanism, generally designated 26, with each of the latching rods 21 in known fashion. The toggle mechanism is positioned in a housing 25 bolted to the gate closure. Upon pivotal movement of the control handle, the rods may be retracted or extended as desired to effect latching or unlatching of the gate closure. Preferably a key lock structure (not shown) is incorporated into handle 24 in known fashion to prevent unauthorized turning thereof. Thus, access to the truck bed may be positively precluded by any except authorized persons having a key to handle 24 when the rear cover segment is in its extended position and the gate closure is down, latched and locked.

The width of gate closure plate 18 is determined by the spacing between the inner surfaces of the sidewalls 3 of the truck body. Plate 18 preferably is of a width slightly less than the spacing between such sidewalls so that the gate closure may be pivoted to the down position even when the movable cover segment 12 is telescoped forwardly, for the purpose to be described.

The gate closure is hingedly connected with the rear cover segment 12 by means of an elongated hinge structure 27 operatively interposed between the upper edge of gate closure plate 17 and the cover segment. In this regard, cover segment 12 is provided with an arcuate gate closure mounting plate 28 seen in FIGS. 4 and 16. The mounting plate 28 in turn is secured to segment 12 in any suitable fashion, such as by welding or riveting the same to the rearmost frame member of the segment noted hereinafter. The opposite side marginal portions of plate 28, designated 29 in FIG. 4, extend along and are secured to the inner surfaces of the opposed walls of movable segment 12 and are cooperable with a reinforcing structure, generally designated 30, for segment 12 as set out hereinafter. Such reinforcing structure 30 is provided with a recess 31 (FIG. 15) at each side of segment 12 to permit the segment to pass over the aforementioned mounting and guiding means 17 during telescoping longitudinal movement of the segment.

Preferably means is provided in conjunction with the gate closure and the truck bed to close off the recess formed by the reinforcing structure cutout portion 31. As best seen in FIG. 15, such means for closing off such cutout comprises an essentially L-shaped flat backup plate 32 secured by welding or the like in upstanding relationship to the end of each of the respective mounting and guiding means 17 secured to each of the sides 3 of the truck body as noted in such FIG. Thus, when gate closure 14 is down and locked, the entire rear of the truck body is fully enclosed as seen in FIGS. 1 and 3.

The gate closure preferably is provided with means for holding the same in the open dotted line position seen in FIG. 16. Such means comprises a spring support structure, generally designated 36, which comprises a flat generally L-shaped support arm 37 having a transverse pivot pin 38 at one end thereof pivotally received within a slotted bracket 39 secured by welding or the like to the aforementioned gate closure mounting plate 28. The lower end of arm 37 has a similar pin 41 slidably received within a slotted bracket 42 riveted or otherwise suitably secured to the inner surface of the gate closure plate 18. A tension spring 43 is interposed between upper bracket 39 and the elbow portion of arm 37. The tension of spring 43 is sufficient that, upon release of the latching rods 21 which lock the end gate closure in place, urging of the spring tends to draw the gate closure to the upper dotted line position shown in FIG. 16 and to hold the same in such position. When the gate is pivoted from the solid line to the dotted line position in FIG. 16 the spring is contracted as shown to hold the gate closure open.

FIGS. 4 and 12 through 14 show the structure 30 mentioned previously for reinforcing the movable cover segment 12 at the rear end thereof. Such reinforcing structure comprises a pair of metal plates 46 and 47 shown in FIGS. 13 and 14 respectively. Plates 46 and 47 enclose the opposite side marginal portions of the movable cover segment 12 along opposite ends of the gate closure plate 18 as best seen in FIG. 4. The downwardly extending portions 29 of mounting plate 28 have a plate 46 welded edge to edge therewith, as seen in FIG. 12, at each side of the movable cover segment. A plate 47 in turn is welded behind each plate 46 to provide backup strength therefore. Each plate 47 includes an extension 48 which is bent forwardly to provide a bracing portion which further increases the strength of the rear portion of the movable cover segment.

It will further be noted from FIGS. 4, 13 and 14 that plate 46 terminates at a location above the bottom margin of the cover segment and that plate 47 is provided with a cutout 49 designed to accommodate the aforementioned cover segment mounting and guiding means 17. It is such cutout 49 which defines the aforementioned recess 31 at each side of the cover segment which the aforementioned plates 32 close off, as seen in FIG. 3.

As noted from FIGS. 5, 6 and 9, each of the cover segments is constructed in the form of a generally U-shpaed shell having opposed generally parallel sidewalls interconnected with a generally flat roof portion through rounded edges. As seen in the noted FIGS., the sidewalls of the rear movable segment 12, designated 51, and the roof portion, designated 52, are formed from a single sheet of suitable metal, such as aluminum or aluminum alloy. The sidewalls 53 and roof portion 54 of the front longitudinally fixed segment are similarly formed from a single sheet of metal, such as aluminum or aluminum alloy.

Preferably, as noted from FIGS. 4 and 5, the roofs of each of the segments are formed with longitudinally extending reinforcing and strengthening ribs 50 spaced laterally on the respective roof portions and extending for substantially the full length thereof. As noted from FIG. 9, when in the collapsed position the movable cover segment 12 is in the telescoped position, its ribs are spaced from and remain free of contact with the under surface of the longitudinally fixed cover segment 13 as a result of the novel mounting and guiding means 17 employed to provide the sole support for the movable cover segment 12.

The rear movable cover segment 12 is structurally reinforced at locations along its length by a series of spaced intermediate channel frame members designated 56 located between a rear frame member 57, which cooperates with the aforementioned gate closure mounting plate 28, and a front channel frame member 58. Similarly, the longitudinally fixed front cover segment 13 is provided with a series of spaced intermediate channel frame members 59 which cooperate with a rear frame member 60 and a front frame member 61 in imparting the necessary rigidity and strength to the cover to withstand the rough wear to which it will be subjected during use. The cover segments and respective channel frame members are secured together in any suitable fashion, such as by welding or riveting.

As also seen from FIGS. 5 and 6, the respective cover segments are provided with longitudinally extending brace members 55 along their respective lower edge margins. The respective frame members of the cover segments are secured in engagement with the upper edges of such braces as shown in such FIGS.

As best seen in FIG. 7, movable cover segment 12 is provided with an L-shaped angle bracket 62 secured flush along the front end thereof by welding or the like. Bracket 62 engages the inner leg of the rear channel frame member 60 of the cover segment 13 when cover segment 12 is moved to the extended position for the purpose of limiting movement of the segment 12 beyond a predetermined position and also for the purpose of providing a fluid seal between the two segments when the cover assembly is fully extended. If desired, the angle bracket 62 may be formed of a nonmetallic sealing material to further enhance its capability to resist the passage of fluid between the segments when extended.

Completing the tilt-up cover embodiment illustrated is the third cover segment 15 (FIG. 2) mentioned previously which is fixedly secured against longitudinal and tilt-up movement. Such fixed cover segment is fixed to the truck body and is defined by a sheet 69 of metal, such as aluminum or aluminum alloy welded or riveted to a pair of channel frame members 67 and 68 respectively. The rear of the fixed segment 15 is open but the front thereof preferably is closed by a flat closure plate 71 welded or otherwise secured in place to frame member 67.

Frame member 67 is a conventional channel of the type utilized for the intermediate frame members 56 and 59 of the other cover segments. However, frame member 68 is of special construction adapted for use in the subject cover assembly and is defined by two segments welded together, as best seen in FIG. 8, to impart a modified Z-shaped configuration thereto. This particular configuration is provided so that the fixed segment 15 may cooperate with the pivotal segments 12 and 13 of the cover assembly to provide a generally flush relationship between the segments 13 and 15 when the cover assembly is pivoted to its downward position.

The stepped configuration of frame member 68 further permits utilization of sealing means between the segments 13 and 15 when the cover is in the down position, as also seen in FIG. 8. In that regard, a strip of suitable sealing material 72 is bonded to the recessed portion of frame member 78 for engagement with the inner surface of the front frame member 61 of segment 13. Thus, a fluid seal between the sidewalls and roof of the cover assembly in the area noted may be effected.

It should also be noted from FIGS. 5, 6 and 19 that the aforementioned angle bracket 62 mounted at the front end of cover segment 12 is designed to engage the front edge 75 of frame member 68 of cover segment 15 to limit extreme telescopic movement of segment 12, as perhaps best noted from FIG. 19. Normally, however, the segments will be positioned for tilt-up movement in the relationship shown in FIG. 19, such relationship being assured by latching gate closure 14 in the position seen in solid lines in FIG. 2.

Each of the cover assembly mounting and guiding means 17 provided along each side of the truck body includes mounting plate structure defined by an L-shaped mounting plate 76 defined by a horizontal portion 77 and an upright vertical portion 78 extending generally normal to the horizontal portion. Each mounting plate 76 extends the full length of the truck body and, as seen from FIGS. 9 and 24 is secured to the truck body by a series of spaced nut and bolt assemblies 79 which extend through that portion of the truck body which defines the opposed sidewalls 3 of the open bed thereof. It is important that the mounting plate be positioned with its upright portion innermost so that the respective cover sections 12 and 13 are positioned outwardly thereof as seen in FIG. 9. This arrangement imparts fluid repelling capability to the cover assembly in that rain and the like is precluded from entering the truck body under the sidewalls of the respective cover segments in conjunction with the upstanding portion 78 of the mounting plate. To further enhance the fluid repellency of the structure, a suitable seal 81 may be provided in a groove 82 formed in the under surface of the horizontal portion 77 of the mounting plate, as seen in FIG. 9. Such mounting plate arrangement also is important because it permits the end gate closure 14 to be closed without restriction when the movable segment 12 is in its telescoped position, and also provides an effective mounting base for the pivoted mounting means of the assembly as will be described.

While the drawings illustrate only one such mounting plate 76, namely that one to the left side of the truck body when looking forward, it should be understood that the mounting plate positioned along the opposite side of the truck body is similarly constructed so that the opposed walls of the respective cover segments are effectively supported.

It should be understood that the novel mounting arrangement disclosed herein permits an entire cover assembly to be separately assembled and interconnected with the respective mounting plates 76 prior to securing the assembly to the vehicle. Thereafter, the entire cover assembly may be easily secured as a unit by the series of bolt and nut assemblies 79 to the respective sidewalls 3 of the truck body. This feature imparts important flexibility to the manufacturing and sales procedures for the subject invention because it is not necessary for a vehicle to be available during manufacture of a given cover.

The guide structure of the mounting and guide means which is designed to permit telescopic movement of cover segment 12 between in its extended and retracted positions is supported by a mounting plate at each side of the truck. Such guide structure comprises an elongated guide track or rail construction, generally designated 86 in FIGS. 2, 10 and 11. In the tilt-up cover assembly embodiment of FIG. 2, the guide rail is formed in two cooperable mating segments 86a and 86b which are selectively positionable in line with each other (FIG. 5) when the cover assembly is in the pivoted downwardly position and which are movable out of line with each other (FIG. 2) when the cover assembly is tilted upwardly.

Rail structure 86 extends from closely adjacent the tail gate 4 of the truck to a position generally in line with the foremost edge of the front cover segment 13 as seen in FIG. 5. In the tilt-up embodiment shown herein which utilizes a rail structure including separable segments, one segment 86a of the rail structure is secured to the outer surface of the upright portion 78 of its associated mounting plate 76. In the nontilt-up embodiment disclosed herein, the rail structure is secured for its entire length to the outer surface of the vertical portion of its associated mounting plate. It is an important feature of this invention that the guide rail 86 is formed so that the front end thereof lies at a lower level than the rear end thereof. As a result, the movable cover segment 12 is elevated as it is moved to the extended position to bring the angle bracket 62 mentioned previously into contact with the rearmost frame member 60 of cover segment 13 to provide the seal mentioned. Conversely, when cover segment 12 is moved from the extended position to the retracted telescoped position, such segment is lowered to provide adequate clearance between the two cover sections during such movement.

In the preferred embodiment illustrated herein, guide rail 86 formed with three discrete but cooperable sections, as best seen in FIG. 5. In that connection, an elongated forward section 87 of the guide rail, which is positioned to extend generally horizontally, is interconnected by an intermediate short abruptly inclined transitional rail section 88 with an elongated generally horizontal rear rail section 89. Such rear section 89, in the embodiment illustrated, preferably is inclined gradually upwardly towards the rear of the vehicle, as noted from FIG. 5.

The guide rail in vertical cross section preferably is generally narrow and oblong having concave upper and lower surfaces and flat sides. The movable cover segment 12 is provided with support structure adapted to ride along the opposite concave surfaces of the guide rail. This configuration for the guide rail minimizes friction and permits smooth telescopic operation of the cover assembly while precluding clogging thereof with dirt or other debris which might tend to accumulate adjacent thereto during use.

The guide rail is mounted at spaced locations along its length by fasteners 91 having spacer sleeves 92 therearound, as best seen in FIG. 11. Along the fixed section 86a of the guide rail, the respective fasteners 91 and their associated spacers 92 are interposed between the guide rail and the upright portion 78 of a mounting plate 76 so that the rail is secured directly to the mounting plate. However, along the section 86b of the guide rail which is pivotal with the cover assembly, the fasteners 91 and spacers 92 are interposed between the rail and an intermediate mounting structure of the type to be described. In either case, the guide rail on each side of the truck body is firmly supported for its intended purpose.

The support structure for segment 12 which is provided in conjunction with the guide rail comprises front and rear wheel mounting assemblies generally designated 94 and 95 (FIG. 5) mounted at the opposite front and rear corners of the segment. As seen in FIGS. 9 through 11, each such mounting assembly comprises an open housing 96 in which wheel means are supported for engagement with the opposite upper and lower guide surfaces of the rail 86.

It will be noted from FIG. 5 that wheel assembly 95 mounted adjacent the rear end of cover segment 12 is secured to its associated frame member 57 thereof on a level which is elevated higher than the level on which the wheel assembly 94 at the front end of cover segment 12 is secured to its associated frame member 58. This elevational differential is provided to insure that the movable cover segment 12 will be substantially horizontally positioned when in the extended position. That is, the difference in elevation of the respective front and rear wheel assemblies compensates for the inclination and height differential imparted to the respective front and rear sections of the guide rail.

Each wheel assembly housing 96 provides means for mounting spaced upper and lower wheels 97 and 98 for engagement with the respective upper and lower guide surfaces of the guide rail as best seen in FIGS. 9 through 11. In that connection, upper wheel 97 is of somewhat larger diameter than lower wheel 98 and is fixedly mounted for rotary movement in housing 96 about a small axle 99 projecting from and secured to the housing.

Lower wheel 98, however, is nonfixedly mounted to permit vertical movement thereof relative to the housing. In that regard, wheel 98 is mounted on a small axle 101 which in turn is secured to a slidable wheel mounting plate 102 positioned within the housing. The housing is provided with a slot 103 in which axle 101 is vertically slidable, wheel 98 moving therewith. Mounting plate 102 for lower wheel 98 in turn is normally spring urged upwardly by a pair of tension springs 104 interposed between the mounting plate and the top of the housing, as best seen in FIG. 10. Thus, under normal operating conditions, springs 104 pull or bias the lower wheel upwardly into engagement with the lower surface of the guide rail. At the same time, upper wheel 97 is held in secure rolling engagement with the upper surface of the guide rail by the biasing effect of the springs.

This spring urged construction for the wheel assemblies insures that the respective wheels are in proper rolling engagement with the guide rail under all operating conditions and in so doing the possibility of rattling and the like encountered with conventional structures known heretofore is obviated. Additionally, the spring urged construction of the wheel assemblies permits the same to negotiate and traverse the intermediate abruptly inclined section 88 of the guide rail as the rear end of cover segment 12 passes between front and rear rail sections 87 and 89 during telescopic movement of such segment.

The improved guide rail structure and its associated wheel assemblies includes another important feature, namely a structure designed to maintain the movable cover segment in predetermined telescoped or expanded positions. Such structure comprises cutout portions formed at preselected locations along the length of the guide rail with which the wheel assemblies are engageable.

As seen in FIG. 5, three such cutouts 105 are provided (one each at the front, rear and center) along the length of each guide rail. The spacing between the respective cutouts is determined by the length of the movable cover segment 12 and the spacing of the wheel assemblies thereon. Thus, when the movable cover segment is in the extended position, rear wheel assembly 95 is engaged with the rear cutout and front wheel assembly is engaged with the center cutout. Conversely, when the movable segment is in the telescoped position, rear wheel assembly 95 is engaged with the center cutout and front wheel assembly 94 is engaged with the front cutout.

Preferably, each cutout 105 is formed in the lower guide surface of the guide rail so that the wheel 98 of each wheel assembly is engageable with a cutout. The upward spring urging of each wheel 98 insures secure interengagement between the wheel assemblies and cutouts for the stated purpose.

As noted previously, depending upon its location along the length of the truck bed, each guide rail is mounted in two different fashions. As perhaps best seen in FIG. 21, rear segment 86a of the guide rail is mounted directly by fasteners 91 and associated spacers 92 to the upright portion 78 of mounting plate 76. However, front segment 86b is mounted to permit that portion of the guide rail to pivot upwardly with the cover assembly when the same is tilted to the position seen in FIGS. 2 and 19.

In this latter regard, as seen in FIG. 20, a generally J-shaped mounting channel 106 is secured by its outer shorter leg 107, by welding or the like, to the inner surface of brace member 55 which extends longitudinally along the inner surface of cover segment 13. The longer inner leg of mounting channel 106 provides the structure to which the guide rail segment 86a, defined by rail sections 87 and 88, is connected by fasteners 91 and spacers 92 as described.

So that the front guide rail sections 87 and 88 will be positioned in line with the rear section 89 of the guide rail when the cover assembly is pivoted to its down position, the front fasteners 91 and spacers 92 are of shorter length than the rear fasteners and spacers because the mounting channel fits within mounting plate 76, as best seen in FIG. 22, when the cover assembly is in the down position. Thus the L-shaped mounting plate 76 provides a guide for the pivotal cover segments when they are moved between their respective up and down positions, and also insures proper alignment of the guide rail segments when the cover assembly is down and latched in place.

Latching means is provided to lock the cover assembly in the down position to preclude accidental release thereof, as seen in FIGS. 19, 19A, 19B and 20 through 22. A latching pin 111 is secured in depending relationship from a mounting bracket 112, which in turn is secured by rivets or bolts 113 with the aforementioned inner leg 108 of mounting channel 106. Latching pin 111 is inverted frustoconical in configuration to facilitate its interengagement with other structures of the latching means as will be described. The latching pin forms the lower end of an adjustable nut and bolt assembly 114 which permits position adjustment of the latching pin relative to the mounting bracket 112 as may be required.

Mounted below and in vertical alignment with the latching pin is a spring detent assembly defined by a headed bolt 116 movably supported in a mounting bracket 117 secured by rivets 119 or the like to the L-shaped mounting plate 76 described previously. An enlarged head 118 is provided on the upper end of the detent bolt and a frustoconical recess 119 is formed in the upper surface thereof which is adapted to receive the lower end of latching pin 111. Interposed between the upper head 118 of the latching bolt and a lower leg of mounting bracket 117 is a coil spring 121 which normally urges the latching bolt to the upward position shown in FIG. 21.

Bracket 117 is generally U-shaped (FIG. 21) and includes an upper leg 121 having an aperture 122 therethrough to accommodate latching pin 111 when the cover assembly is pivoted to the down position.

Locking structure is provided to prevent inadvertent separation of latching pin 111 from the detent structure when the same are interengaged as seen in FIG. 22. Such locking structure comprises a release handle 126 pivotally mounted on the U-shaped bracket 117 of the detent assembly by a pivot pin 127. A bias spring 128 is interposed between release handle 126 and bracket 117, with intermediate contact around pivot pin 127, for the purpose of normally holding the locking handle in the locking position shown in FIGS. 21 and 22. It will be noted from FIG. 22 that, when the locking handle is in the position shown, an extension 129 overlies and engages latching pin 111 and precludes its removal from engagement with the detent and the bracket 117 on which the detent is mounted. Thus, it is necessary to pivot handle 126 away from the L-shaped mounting plate 76 (that is inwardly of the vehicle body) to permit latching pin 111 to clear the bracket upper leg 121.

It will be understood that when movable cover segment 12 is in the telescoped position, access to handle 126 may be readily obtained by reaching into the open end of the telescoped cover assembly. The latching handle is positioned closely adjacent the rear end of cover segment 13 as seen in FIG. 2 for easy access thereto. While only one latching means of the type described is required, if preferred, duplicate latching means may be provided on the opposite side of the truck body.

Upon releasing the latching means, the telescoped cover assembly may be pivoted upwardly to provide unrestricted access to the truck bed as described previously. Upon pivoting of the cover assembly downwardly, the tapered construction of the latching pin 111 effects automatic locking of the assembly in the down position and proper alignment of the separable segments 86a and 86b of the guide rail 86 so that the cover segment 12 may be moved to its extended position. In that connection, as noted from FIGS. 19A, 19B and 23, the cooperable guide rail segments are provided with cooperable tapered end surfaces to facilitate their alignment and operative interengagement.

Means pivotally mounting the cover assembly are provided in conjunction with each side of the truck body and, in the embodiment illustrated, each such means comprises a mounting bracket 131 secured by bolts 132 or the like to the aforementioned mounting plate 76 adjacent its front end. Interposed between mounting plate 76 and the aforementioned J-shaped mounting channel 106 of the cover segment 13 are a pair of pivot links 133 and 134. Such links are pivotally connected by suitable pivot pins between the mounting plate 76 and mounting channel as noted. A pivot arm 136 is pivotally secured at one end to mounting bracket 131 and links 133 and 134 are connected therewith.

A strong tension spring 137 is interposed between a free end of pivot arm 136 adjacent link 133 and a bent end slotted portion 138 of the mounting bracket. Spring 137 tends to hold the cover assembly in the down position when the assembly is thus oriented. However, because of the over center toggle arrangement and construction imparted by the toggle links 133 and 134, the spring also holds the cover segment in the tilted up position shown in FIG. 2.

An arcuate guide slot is provided in mounting bracket 131 and a guide pin 140 which projects from link 134 rides therein. This interengaged slot-pin structure insures proper pivotal movement of the pivotal mounting means for the cover assembly.

While the pivotal mounting arrangement specifically illustrated in FIG. 19 is very effective for the purpose intended, it should be understood that other equivalent arrangements may be substituted therefor if desired.

As noted previously, the end gate closure 14 for the cover assembly may be pivoted down and locked in the down position when the cover assembly is telescoped and pivoted to the position seen in FIG. 2. To that end, each of the mounting channels 106 along opposite sides of the truck is provided with a hole 141 (FIG. 19A) adjacent its rear end to receive a latching rod 21 therein. A similar hole (not shown) is formed in each of the mounting plates 76 adjacent its rear end to receive a latching rod when the cover assembly is extended, as seen in FIG. 15.

However, when the cover assembly is telescoped, a structure is required to permit the gate closure to be latched with the pivotal cover segments without interfering with such pivoting. To that end, as seen in FIG. 19B, the upright portion 78 of mounting plate 76 is provided with a downwardly tapered open slot 142 to accommodate a latching rod 21 therein when the cover assembly is in its down position, as seen in such FIG.

Referring now to FIG. 24, the longitudinally fixed and pivotally fixed cover segment 15 positioned at the front of the cover closely adjacent the rear wall 7 of the cab of the truck is shown secured in place by means of an L-shaped bracket 151 secured directly, by bolt and nut assemblies 79 of the type described previously, to the mounting plate 76 which in turn is secured to the sidewall structure 3 of the truck body. Thus the same mounting plates 76 along opposite sides of the truck may be utilized to mount and operatively position all portions and segments of the cover assembly described.

Referring now to FIG. 2A, a nonpivotal embodiment of the subject cover assembly is illustrated. Such assembly, designated generally 2a, includes a fixed cover segment 156, which is neither longitudinally movable nor pivotal, and a longitudinally slidable cover segment 157 which is telescopically movable relative to fixed segment 156. A gate closure structure 158 corresponding in construction to gate closure structure 14 described previously preferably is positioned at the rear end of movable segment 157. The fixed cover segment 156 in the illustrated embodiment includes a continuous guide rail designated 160 having a generally horizontal front section 159, an intermediate abruptly inclined section 161, and a generally horizontal but gradually upwardly inclined rear section 162 for the same purpose described previously.

The guide rail structure described is secured directly to an L-shaped mounting plate 163 corresponding to the aforementioned plate 76, in the manner shown in FIG. 21 for the pivotal cover assembly embodiment described previously. Similarly, wheel assemblies 164 and guide rail cutouts 165 of the type described previously are utilized for the same purpose mentioned previously. In important operational features and details, the nonpivotal arrangement shown in FIG. 2A corresponds to the pivotal construction described previously except that the pivotal mounting means, the segmented guide rail structure, and the cover assembly latching means, are not required. Also, a small third cover segment corresponding to segment 15 of the pivotal embodiment, is not required. The front end of the fixed segment 156 is enclosed to preclude access therethrough.

Having thus made a full disclosure of preferred embodiments of this invention, reference is directed to the appended claims for the scope of protection to be afforded thereto.

I claim:

1. A telescopic cover assembly for covering the open bed of a vehicle, such as a truck, comprising
    A. at least two cover segments of different sizes and of generally inverted U-shaped cross-sectional configuration,
    B. means at opposite sides of said segments for mounting said segments on the body of said vehicle on opposite sides of said bed and for guiding at least one of said segments for telescopic movement relative to another segment between an extended position and a retracted position, each said mounting and guiding means including
        1. elongated mounting plate structure comprising a generally horizontal portion to be secured along one side of said vehicle body and a generally upright portion integral with said horizontal portion and positioned interiorly thereof,
        2. guide rail structure extending along said mounting plate structure and supported thereby for at least part of its length,
        3. said guide rail structure being secured to and extending along the outer surface of said upright portion of said mounting plate structure so that said movable cover segment is movable along the outer side of said upright portion and the inner side of said upright portion is free of obstructions,
    C. support structure mounted on said movable cover segment which is engageable with and rideable on each said guide rail structure during movement of such segment, and D. gate closure means hingedly connected with an upper margin of the rear end of said movable cover segment for upward and outward pivotal movement relative to said movable cover segment to permit access to the interior of such segment,
 1. said gate closure means comprising a closure plate which is pivotal downwardly to a closed position closing off said end of said movable cover segment in all positions of such movable segment.

2. The cover assembly of claim 1 in which said guide rail structure comprises
 a. first and second separable rail sections,
 b. said first section being secured to said mounting plate structure,
 c. said second section being secured to said other cover segment and being free of direct connection with said mounting plate structure,
 d. said support structure mounted on said movable segment being rideable on said second section when said movable segment is telescoped into said other segment, and
 e. means pivotally mounting said other cover segment for tilt-up pivotal movement relative to said vehicle bed,
 f. said other cover segment being pivotal as a unit with said movable segment and said second rail section relative to said vehicle bed when said movable segment is telescoped into said other cover segment.

3. The cover assembly of claim 2 in which said pivotal mounting means includes
 1. toggle link and spring mechanism for holding said assembly in a tilted-up position in which substantially unrestricted access to said vehicle bed may be had.

4. The cover assembly of claim 2 which further includes releasable latching means for positively holding said other cover section in a down position overlying said vehicle bed.

5. The cover assembly of claim 4 in which said releasable latching means comprises
 1. a latching pin on said other cover segment,
 2. a detent supported by said mounting plate structure in which said latching pin is normally received,
 3. a releasable latching handle normally engaged with said latching pin for precluding separation of said pin from said detent, and
 4. spring structure normally urging said latching handle into engagement with said latching pin.

6. The cover assembly of claim 5 in which
 a. said latching handle is mounted interiorly of said cover assembly and is accessible from outside said assembly only when said movable cover segment is in the retracted position.

7. The cover assembly of claim 1 in which said guide rail structure includes
 a. an inclined portion which is elevated in a direction extending toward the rear of said vehicle bed for elevating said movable cover segment relative to said vehicle bed as such segment moves from its retracted position toward its extended position.

8. The cover assembly of claim 1 in which said guide rail structure includes
 a. a first generally horizontal section located within said other cover segment and extending rearwardly from adjacent the front of said vehicle bed,
 b. a second generally horizontal section located within said movable cover segment when the same is in its extended position and extending forwardly from adjacent the rear of said vehicle bed, and
 c. an intermediate inclined section interposed between said first and second rail sections,
 d. said second section being elevated relative to said first section.

9. The cover assembly of claim 8 in which
 e. said second rail section is gradually inclined upwardly from its point of juncture with said intermediate section toward said rear of said vehicle bed.

10. The cover assembly of claim 1 in which

E. said gate closure means pivotally with and mounted on said end of said movable cover segment includes
 1. latching structure for positively holding said gate closure means in a down position closing said end of said movable cover segment in both said extended position and said retracted position thereof.

11. The cover assembly of claim 10 in which said gate closure means further includes
 2. spring hinge structure for selectively holding said gate closure means in an upwardly pivoted open position when said gate latching structure is released.

12. The cover assembly of claim 10 in which said gate closure means is pivotal to its closed position extends between said opposed plate structures of said mounting and guiding means at opposite sides of said vehicle bed when said movable cover segment is in its retracted position.

13. The cover assembly of claim 10 in which said latching structure includes at least one laterally movable latching rod mounted on said gate closure means, said latching rod being interengageable with a mounting plate structure when said gate closure means is pivoted to its closed position and said movable cover segment is in either of its retracted or extended positions so that such gate closure means may be positively held in such closed position.

14. The cover assembly of claim 1 which further includes
 E. mounting plate structure secured to the opposite side margins of said movable cover segment at said rear end thereof which close off such movable segment between said gate closure means and the walls which defined said movable segment,
  1. each said mounting plate structure having a cut out portion at the side of said movable cover segment which conforms generally to the configuration of the respective mounting and guiding means and permits said movable segment to pass therealong without interferring therewith during movement of said movable cover segment.

15. The cover assembly of claim 14 which further includes
 F. a generally L-shaped backup plate secured to the rear end of each of the respective mounting plate structures and extending generally upright relative thereto externally of said movable cover segment to close off said cut out portions in said mounting plate structure of said movable cover segment when such segment is in its extended position,
  1. said backup plates and said end gate closure means completely closing off said movable cover segment is in its extended position and said gate closure means is pivoted downwardly to its closed position and latched.

16. The cover assembly of claim 1 in which said support structure mounted on said movable cover segment comprises
 1. at least one wheel assembly mounted adjacent the respective front and rear ends of said movable segment.

17. The cover assembly of claim 16 in which each said wheel assembly comprises
 a. a housing,
 b. upper and lower wheels rotatably mounted on said housing for rolling engagement with said guide rail structure, and
 c. spring structure engaged with at least one of said wheels for urging the same into engagement with said guide rail structure.

18. The cover assembly of claim 17 which further includes
 d. cutouts formed at predetermined locations in a lower surface of said guide rail structure and in which
 e. the lower wheel of each wheel assembly is urged upwardly by said spring structure into engagement with said lower guide rail surface for engagement in a cutout when such wheel and cutout are aligned with each other.

19. The cover assembly of claim 17 in which each of said guide rail structures includes an elongated guide rail which is narrow and generally oblong in cross section having convex upper and lower surfaces along which the wheels of an associated wheel assembly ride during movement of said movable cover segment.

20. The cover assembly of claim 16 in which said guide rail structure includes
   a. cutouts formed in a surface thereof along which one of said wheel assemblies is movable,
   b. said cutouts being formed at predetermined locations along said guide rail structure for engagement with said one wheel assembly to retain said movable cover segment in a predetermined position in accordance with the location of said cutouts 21. A combined telescopic and tilt up cover assembly for covering the open bed of a vehicle, such as a truck, comprising
   A. at least two cover segments one of which is telescopically movable longitudinally into the other,
   B. separable means mounting said cover segments on said vehicle above said bed for such longitudinal movement relative to each other,
   C. other means mounting said cover segments on said vehicle above said bed for tilt up pivotal movement as a unit with part of said separable mounting means away from said vehicle bed to provide substantially unrestricted access to said bed when said one cover segment is telescopically positioned within said other cover segment, and
   D. releasable latching means integral with said cover assembly operatively interposed between one of said cover segments and said vehicle bed for releasably maintaining said cover segments in a down position overlying said bed, a portion of said releasable latching means being pivoted with said cover segments during tilt up movement thereof.

22. The cover assembly of claim 21 in which said seperable means for mounting said cover segments for said relative longitudinal movement includes
   1. elongated mounting plate structure comprising a generally horizontal portion to be secured along one side of said vehicle body and a generally upright portion integral with said horizontal portion and positioned interiorly thereof,
   2. guide rail structure extending along said mounting plate structure and supported thereby for at least part of its length, and
   D. support structure mounted on one of said cover segments which is engageable with and rideable on said rail structure during movement of such segment relative to the other of said segments.

23. The cover assembly of claim 22 in which said guide rail structure comprises
   a. first and second separable rail sections,
   b. said first section being secured to said mounting plate structure,
   c. said second section being secured to said other cover segment and being free of direct connection with said mounting plate structure,
   d. said support structure mounted on said one segment being rideable on said second rail section when said one segment is moved relative to said other segment.

24. The cover assembly of claim 22 in which said guide rail structure includes
   a. an inclined portion which is elevated in a direction extending toward the rear of said vehicle bed for elevating said one cover segment as the same moves from a retracted position toward an extended position.

25. The cover assembly of claim 22 in which said guide rail structure includes
   a. a first generally horizontal section located within said other cover segment and extending rearwardly from adjacent the front of said vehicle bed,
   b. a second generally horizontal section located within said one cover segment when the same is in an extended position and extending forwardly from adjacent the rear of said vehicle bed, and
   c. an intermediate inclined section interposed between said first and second rail sections,
   d. said second section being elevated relative to said first section.

26. The cover assembly of claim 25 in which
   e. said second rail section is gradually inclined upwardly from its point of juncture with said intermediate section toward said rear of said vehicle bed.

27. The cover assembly of claim 22 which includes
   E. gate closure means pivotally connected with and mounted on said one cover segment, including
      1. latching structure for holding said gate closure means in a down position closing an end of said one segment when the same is in an extended position or a retracted position.

28. The cover assembly of claim 21 in which said portion of said releasable latching means is mounted on said other cover segment and comprises a latching pin, said latching means also including a releasable latching handle which is interengageable with said latching pin, said latching pin and handle being located within said other cover segment so that said handle is accessible from outside said cover assembly only when said one cover segment is telescoped into said other cover segment.

29. A telescopic cover assembly for covering the open bed of a vehicle, such as a truck, comprising
   A. at least two cover segments one of which is telescopically movable longitudinally into the other segment,
   B. means mounting said one cover segment for such movement relative to the other comprising
      1. an elongated guide rail structure extending along opposite sides of said vehicle bed along which said one cover segment is movable, and
      2. at least one wheel assembly mounted adjacent the respective front and rear ends of said movable segment, each said wheel assembly comprising
         a. a housing,
         b. upper and lower wheels rotatably mounted on said housing for rolling engagement with said guide rail structure, and
         c. spring structure engaged with at least one of said wheels for urging the same into engagement with said guide rail structure.

30. The cover assembly of claim 29 in which each said guide rail structure includes
   a. cutouts formed in a surface thereof over which one of said wheels is rollable,
   b. said cutouts being formed at predetermined locations along said guide rail structure for receiving said one wheel therein to retain said movable cover segment in a predetermined position in accordance with the location of said cutouts.

31. The cover assembly of claim 30 in which
   c. said cutouts are formed in a lower surface of said guide rail structure, and in which
   d. the lower wheel of each wheel assembly is urged upwardly by said spring structure into engagement with said lower guide rail surface for engagement in a cutout when such wheel and cutout are aligned with each other.

32. The cover assembly of claim 29 in which said guide rail structure comprises
   a. first and second separable rail sections one of which is operatively secured to said vehicle body and the other of which is mounted on said other cover segment, and
   C. means pivotally mounting said other cover segment for tilt-up movement as a unit with said one cover segment and said other rail section therewith.

33. A telescoping cover assembly for covering the open bed of a vehicle, such as a truck, comprising
   A. at least two nestable rigid cover segments of different sizes and of generally inverted U-shaped cross-sectional configuration,
   B. means at opposite sides of said segments for mounting said segments on the body of said vehicle on opposite sides of said vehicle bed and for guiding at least one of said segments for telescoping movement relative to another segment between an extended position and a retracted position, including 1. a guide rail structure including an inclined section along which said one segment is movable between said extended positions,
2. said inclined rail section elevating said one segment during movement thereof toward said extended position, and C. means carried by said one segment engaging said guide rail structure for transporting said one segment from said retracted position to said extended position, and vice versa.

34. The cover assembly of claim 33 in which said guide rail structure includes
  a. a substantially horizontal section positioned inside said other segment,
  b. a substantially horizontal section positioned outside said other segment,
  c. said inclined section connecting said inside and outside rail sections and spacing said outside section above said inside section.

35. The cover assembly of claim 34 in which said outside rail section is slightly downwardly inclined toward said inside rail section.

36. In a vehicle cover assembly having a plurality of telescoping cover segments at least one of which is mounted for movement on an elongated guide rail by oppositely disposed wheel means carried by said movable cover segment and engaged with said guide rail,
  A. the improvement wherein the guide rail includes an inclined portion which elevates said movable cover segment when said movable segment is moved thereover from a telescoped retracted position toward an extended position,
  B. one of said wheel means being fixed relative to said movable segment and the other wheel means being biased toward said fixed wheel means into engagement with said guide rail.

37. The cover assembly of claim 36 in which said guide rail further includes
  1. a cutout in one surface thereof,
  C. said biased wheel means being engageable in said cutout when said movable cover segment is in a predetermined position relative to the other of said cover segments.

38. The cover assembly of claim 37 in which said biased wheel means is biased upwardly, and in which said cutout is formed in a lower surface of the guide rail.

39. The cover assembly of claim 36 in which said wheel means include
  1. wheel supporting platforms mounted adjacent the rear end and front end respectively of said movable cover segment,
  2. said wheel supporting platforms adjacent said cover rear end being mounted thereon at a level above the level at which the other wheel supporting platforms are mounted adjacent said front end of such segment, so that such segment remains generally level when in the extended position and may be moved toward the retracted position without interference from the other segment of said assembly during such movement.

40. The cover assembly of claim 36 in which said guide rail is narrow and generally oblong in cross section having convex upper and lower surfaces along which said wheel means ride.